UNITED STATES PATENT OFFICE.

FRIEDRICH RUNKEL, OF ELBERFELD, GERMANY, ASSIGNOR TO FARBEN-FABRIKEN OF ELBERFELD CO., OF NEW YORK, N. Y., A CORPORATION OF NEW YORK.

YELLOW AZO DYE AND PROCESS OF MAKING SAME.

SPECIFICATION forming part of Letters Patent No. 719,049, dated January 27, 1903.

Application filed October 11, 1902. Serial No. 126,942. (No specimens.)

*To all whom it may concern:*

Be it known that I, FRIEDRICH RUNKEL, doctor of philosophy, chemist, (assignor to the FARBENFABRIKEN OF ELBERFELD CO., of New York,) residing at Elberfeld, Germany, have invented a new and useful Improvement in Yellow Azo Coloring-Matter and Process of Making Same; and I hereby declare the following to be a clear and exact description of my invention.

My invention relates to the production of new valuable azo dyestuffs by combining the hitherto-unknown sulfonic acids of the indol group with aromatic diazo compounds, such as diazobenzene, diazonaphthalene, diazoazobenzene, or the like. The said new sulfonic acids of the indol series containing the sulfonic groups in the benzene nucleus can be obtained by treating with sulfonating agents indol derivatives, such as alpha-methylindol, ($Pr_2$-methylindol,) $B_3$-$Pr_2$-dimethylindol, or derivatives thereof substituted in the benzene nucleus or alkylated in the imido group or the like.

The starting materials for the preparation of the new indol sulfonic acids can be prepared according to the method of E. Fischer (see *Annalen der Chemie*, Vol. 236, pages 153 to 155) by melting together the corresponding ketohydrazones and zinc chlorid.

The new dyestuffs produced with the aid of the above-mentioned indol derivatives are from yellow to brown powders soluble in water and in ammonia and dyeing wool from yellow to orange shades.

In carrying out my new process practically I can proceed as follows, the parts being by weight: 13.1 parts of alpha-methylindol ($Pr_2$-methylindol) of the formula

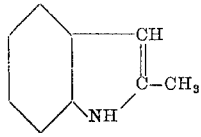

are stirred into twenty-six parts of sulfuric monohydrate under cooling. Into the resulting mixture one hundred and five parts of fuming sulfuric acid (twenty per cent. of $SO_3$) are slowly run, taking care that the temperature does not rise higher than about 60° centigrade. The reaction is finished when a test portion is entirely soluble in water or when a test portion treated with an excess of alkali and shaken with ether does not give up any more alpha-methylindol to the ether. When this point is reached, the reaction mass is poured into one thousand parts of ice-water. To this solution a diazo solution prepared in the usual manner from 10.7 parts of orthotoluidin is added. The liquid assumes a yellow color, and after some hours the dye stuff sulfonic acid is separated in the shape of orange-red flakes. The separation is completed by the addition of a common salt. It is filtered off, washed with a solution of common salt, and dissolved in a hot solution of eight parts of sodium carbonate in five hundred parts of water. The new coloring-matter is then separated from this solution by the addition of common salt. It represents a yellow powder, being soluble in water, alcohol, and ammonia with a yellow color. It is dissolved by concentrated sulfuric acid of 66° Baumé, with an orange-yellow color, and dyes wool yellow shades very fast to light. The process proceeds in an analogous manner if other indol sulfonic acids or if other diazo compounds, diazoazo compounds, or tetrazo compounds are used.

Hereunder I give the shades of some of the new dyestuffs:

| Dyestuff prepared by combination of diazotized— | With the sulfonic acid of— | Dyes wool from acid-bath— |
|---|---|---|
| Anilin | α-methylindol | Yellow. |
| O-toluidin | $B_3$-methyl $Pr_{1n}$-ethyl-2-methylindol. | Yellow. |
| M-toluidin | α-methylindol | Yellow. |
| P-xylidin | $Pr_{1n}$-2-dimethylindol | Yellow. |
| O-chloroanilin | $Pr_{1n}$-ethyl-2-methylindol | Yellow. |
| O-nitranilin | $Pr_{1n}$-2-dimethylindol | Orange-yellow. |
| P-nitranilin | α-methylindol | Orange. |
| α-naphthylamin | $Pr_{1n}$-2-dimethylindol | Orange. |
| β-naphthylamin | α-methylindol | Yellow. |

Having now described my invention and in what manner the same is to be performed, what I claim as new, and desire to secure by Letters Patent, is—

1. The process for producing new azo dyestuffs by first combining diazo derivatives of aromatic amins with the sulfonic acids of indol derivatives and secondly isolating the dyestuffs thus obtained, substantially as hereinbefore described.

2. The process for producing a new azo dyestuff by first combining diazotized orthotoluidin with the sulfonic acid of alpha-methylindol and secondly isolating the dyestuff thus produced, substantially as hereinbefore described.

3. The herein-described new azo dyestuffs derived from indol sulfonic acids and diazo compounds of aromatic amins, which dyestuffs are, when dry and pulverized, from yellow to brown powders soluble in water and in ammonia and dyeing wool from yellow to orange shades, substantially as hereinbefore described.

4. The herein-described new azo dyestuff derived from orthotoluidin and the sulfonic acid of alpha-methylindol which is, when dry and pulverized, a yellow powder soluble in water, alcohol, ammonia with a yellow color, in concentrated sulfuric acid of 66° Baumé with an orange-yellow color and dyeing wool yellow shades fast to light, substantially as hereinbefore described.

In testimony whereof I have signed my name in the presence of two subscribing witnesses.

FRIEDRICH RUNKEL.

Witnesses:
OTTO KÖNIG,
EMIL BLUMBERG.